US006195489B1

(12) United States Patent
Oohashi et al.

(10) Patent No.: US 6,195,489 B1
(45) Date of Patent: *Feb. 27, 2001

(54) OPTICAL FIBER CORD, RIBBON CORD USING THE SAME AND RIBBON CORD BRANCH LINE

(75) Inventors: Keiji Oohashi, Sakura; Tsuyoshi Shimomichi, Chibaken; Etsuo Ino, Sakura; Tetsuo Hayano, Narita; Kazunaga Kobayashi, Funabashi; Katuyoshi Ishida, Sakura; Hajime Takemoto; Masao Tachikura, both of Tokyo, all of (JP)

(73) Assignees: Fujikura Ltd.; Nippon Telegraph And Telephone Corporation, both of Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,343

(22) Filed: Jan. 30, 1998

(30) Foreign Application Priority Data

Jan. 31, 1997 (JP) .................................................. 9-019502
Jul. 14, 1997 (JP) .................................................. 9-188762

(51) Int. Cl.[7] .................................................. G02B 6/44

(52) U.S. Cl. .......................... 385/102; 385/100; 385/114

(58) Field of Search .................................. 385/100–102, 385/113–114, 126–128

(56) References Cited

U.S. PATENT DOCUMENTS

| | | | | |
|---|---|---|---|---|
| 4,715,677 | * | 12/1987 | Saito et al. | 350/96.23 |
| 4,741,594 | | 5/1988 | Suzuki | 385/115 |
| 4,765,712 | * | 8/1988 | Bohannon, Jr. et al. | 350/96.23 |
| 4,800,121 | * | 1/1989 | Ohta et al. | 428/364 |
| 4,929,047 | * | 5/1990 | Dubots et al. | 385/107 |
| 5,230,033 | | 7/1993 | Soodak | 385/105 |
| 5,369,720 | * | 11/1994 | Parry et al. | 385/114 |
| 5,463,711 | * | 10/1995 | Chu | 385/101 |
| 5,493,626 | * | 2/1996 | Schultz et al. | 385/101 |
| 5,673,352 | * | 9/1997 | Bauer et al. | 385/114 |
| 6,074,968 | * | 6/2000 | Yoneda et al. | 385/142 |
| 6,115,522 | * | 9/2000 | Tachikura et al. | 385/102 |

OTHER PUBLICATIONS

Patent Abstacts of Japan, vol. 11, No. 386 (P–647), Dec. 17, 1987, JP 62 153809, Jul. 8, 1987.

Patent Abstracts of Japan, vol. 12, No. 441 (P–789), Nov. 21, 1988, JP 63 170607, Jul. 14, 1988.

* cited by examiner

*Primary Examiner*—John D. Lee
*Assistant Examiner*—Juliana Kang
(74) *Attorney, Agent, or Firm*—Oblon, Spivak, McClelland, Maier & Neustadt, P.C.

(57) ABSTRACT

Metal filaments such as steel wires which has Young's modulus of 10,000 kg/mm$^2$ are provided longitudinally on a UV curable resin coated optical fiber. A resin covering layer is then formed on a resultant structure by coating ultraviolet curing resin and then curing the resin, whereby resulting in an extremely small optical fiber cord having a finished diameter of about 250 $\mu$m.

10 Claims, 3 Drawing Sheets

5
3
2
1
3
4

OPTICAL FIBER CORD, RIBBON CORD USING THE SAME AND RIBBON CORD BRANCH LINE

BACKGROUND OF THE INVENTION

1. Field of the Invention

The present invention relates to an optical fiber cord with a small diameter suitable for high-density assembly of wirings between central office equipments, central office optical wirings, or the like, a ribbon cord using the same, and a ribbon cord branch line using the same.

2. Description of the Related Art

The request for higher density assembly of the central office equipments has been increased according to the spread of optical fiber construction in the subscriber's system. In order to satisfy such a request, an optical fiber cord with a small diameter, which is to be used as wirings in or between central office equipments, etc., has been needed.

The optical fiber cord with a small diameter according to a first related art is constructed such that a yarn made of aramid fiber, glass fiber, carbon fiber, etc. are provided longitudinally along a UV curable resin coated optical fiber of a diameter of 250 μm and then ultraviolet curing resin is coated thereon and cured. A fiber-reinforced covering layer which is formed by distributing reinforcing fibers integrally into the ultraviolet curing resin is then provided. In general, the optical fiber cord having the above configuration has a finished diameter of about 0.5 to 1 mm.

However, in the optical fiber cord according to the first related art, the reinforcing fiber serving as a tension member has been formed like a yarn. Since the yarn has not been tight, a packing factor (ratio of true volume to bulk volume) of the reinforcing fiber in the fiber-reinforced covering layer has not been able to be increased more than 50 volumetric %, so that it has been impossible to be accomplished sufficiently high reinforcement per unit cross section of covering layer. Accordingly, it has been difficult to be accomplished sufficiently high reinforcement in case of making covering layer be smaller in thickness. For example, in the prior art, it has been impossible to fabricate the optical fiber cord with an extremely small diameter of about 250 μm as the finished diameter.

Hence, it may be considered to increase a packing factor of the fiber-reinforced covering layer by applying monofilament aramid fibers to the optical fiber cord according to the first related art. However, it has been difficult to form such aramid fiber as a monofilament. Since the result ant monofilament is thus inferior to the yarn in characteristic, the sufficiently high reinforcement effect has not been able to be expected.

Otherwise, it is sufficiently possible to employ monofilament glass fibers in the optical fiber cord according to the first related art. However, since such monofilament lacks flexibility, the monofilament has not been satisfied in reliability due to the breakdown during operation.

FIG. 1 is a schematic lateral sectional view showing an optical fiber cord with a small diameter according to a second related art.

The optical fiber cord according to the second related art is constructed such that a yarn 103 made of aramid fiber, glass fiber, etc. are provided longitudinally as a tension member around a UV curable resin coated optical fiber 102 and then a covering layer 104 made of ultraviolet curing resin, etc. is coated thereon and integrally cured.

However, in the optical fiber cord according to the second related art, the reinforcing fiber serving as tension member has been formed like a yarn. Therefore, a rate of the yarn 103 occupied in the covering layer 104 has not been able to be increased more than 50 volumetric %. For this reason, since it has been impossible to be accomplished high reinforcement per unit cross section of covering layer in case of making the covering layer e smaller in thickness, it has been difficult to reduce the finished outer diameter less than 0.5 mm.

In addition, a ribbon cord which is constructed by arranging a plurality of the optical fiber cords in parallel and forming integrally by a matrix material has not been made small in thickness and width similarly, so that such ribbon cord has not satisfied the request for higher density assembly of the central office optical wirings.

Moreover, in the ribbon cord employing the optical fiber cord according to the second related art, the yarn 103 serving as the tension member is provided around the UV curable resin coated optical fiber 102. Because of the presence of the yarn 103 provided between adjacent UV curable resin coated optical fibers 102, it has been difficult to expose top ends of the UV curable resin coated optical fibers 102 by removing the matrix material and the covering layer 104 together. There has been such a disadvantage that, since a dimensional discrepancy because of the intervention of the yarn 103 resides between the ribbon cord employing the optical fiber cord according to the second related art and the ordinary optical fiber ribbon, it is impossible to collectively splice them.

SUMMARY OF THE INVENTION

The present invention has been made in light of the above circumstances, and it is an object of the present invention to provide an optical fiber cord which is able to have an extremely small diameter of less than 500 μm, preferably about 250 μm as a finished diameter, for example, by enhancing its reinforcement effect sufficiently.

It is another object of the present invention to provide a ribbon cord from which a matrix material and a covering layer together with tension members can be collectively removed and which can be collectively spliced to ordinary optical fiber ribbons when the ribbon cord is formed by using the optical fiber cords, and a ribbon cord branch line formed with the use of the ribbon cord.

In order to achieve the above objects, according to an aspect of the present invention, there is provided an optical fiber cord comprising:

- a UV curable resin coated optical fiber;
- a plurality of monofilaments provided on the UV curable resin coated optical fiber along a longitudinal direction; and
- a resin covering layer formed on a resultant structure.

In the preferred embodiment of the present invention, an outer diameter of the UV curable resin coated optical fiber is set in a range of 120 μm to 200 μm (preferably a range of 123 μm to 127 μm), an outer diameter of the metal monofilament is set in a range of 20 μm to 50 μm, and a finished diameter is set in a range of 190 μm to 300 μm (preferably a range of 230 μm to 270 μm).

According to another aspect of the present invention, there is provided an optical fiber cord comprising:

- a UV curable resin coated optical fiber;
- metal monofilaments provided longitudinally on an outer periphery of the UV curable resin coated optical fiber; and
- a resin covering layer provided integrally with the UV curable resin coated optical fiber so as to surround the metal monofilaments.

In the preferred embodiments of the present invention, the metal monofilaments are formed by metal wires each of which has a diameter of 20 μm to 50 μm and elastic modulus in tension of more than 10,000 kg/mm$^2$ and less than 50,000 kg/mm$^2$. Preferably an enamel thin film with a thickness of 2 to 3 μm is coated on a surface of the metal monofilament. Preferably a packing factor of the metal monofilaments in the resin covering layer is set to 10 to 80 volumetric %. Preferably the resin covering layer is formed by coating ultraviolet curing resin and then curing the ultraviolet curing resin. Preferably a thickness of the resin covering layer is set substantially equal to an outer diameter of the metal monofilament.

According to still another aspect of the present invention, there is provided an optical fiber cord which is characterized by providing a plurality of tension wires on a UV curable resin coated optical fiber longitudinally and then covering a resultant structure with a covering layer integrally so as to have a rectangular sectional shape; and wherein the plurality of tension wires are provided in the covering layer on a pair of parallel-opposing surface sides and no tension wire is provided in the covering layer on another pair of parallel-opposing surface sides.

According to yet still another aspect of the present invention, there is provided a ribbon cord comprising:

a plurality of optical fiber cords each of which is constructed by providing a plurality of tension wires on a UV curable resin coated optical fiber longitudinally and then covering a resultant structure with a covering layer integrally so as to have a rectangular sectional shape; and wherein the plurality of tension wires are provided in the covering layer on a pair of parallel-opposing surface sides and no tension wire is provided in the covering layer on another pair of parallel-opposing surface sides, and wherein the plurality of optical fiber cords are arranged in parallel such that the another pair of parallel-opposing surface sides of respective optical fiber cords are brought into tight contact with each other by covering integrally the plurality of optical fiber cords with a matrix material.

According to further aspect of the present invention, there is provided a ribbon cord branch line comprising:

a ribbon cord including a plurality of optical fiber cords each of which is constructed by providing a plurality of tension wires on a UV curable resin coated optical fiber longitudinally and then covering a resultant structure with a covering layer integrally so as to have a rectangular sectional shape; and wherein the plurality of tension wires are provided in the covering layer on a pair of parallel-opposing surface sides and no tension wire is provided in the covering layer on another pair of parallel-opposing surface sides, wherein the plurality of optical fiber cords are arranged in parallel such that the another pair of parallel-opposing surface sides of respective optical fiber cords are brought into tight contact with each other by covering integrally the plurality of optical fiber cords with a matrix material, and wherein one end of the ribbon cord is branched into respective optical fiber cords and then connectors are fitted individually onto respective top ends of the optical fiber cords, and other end of the ribbon cord is collectively spliced to multi-fiber ribbons.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

Figure 1:
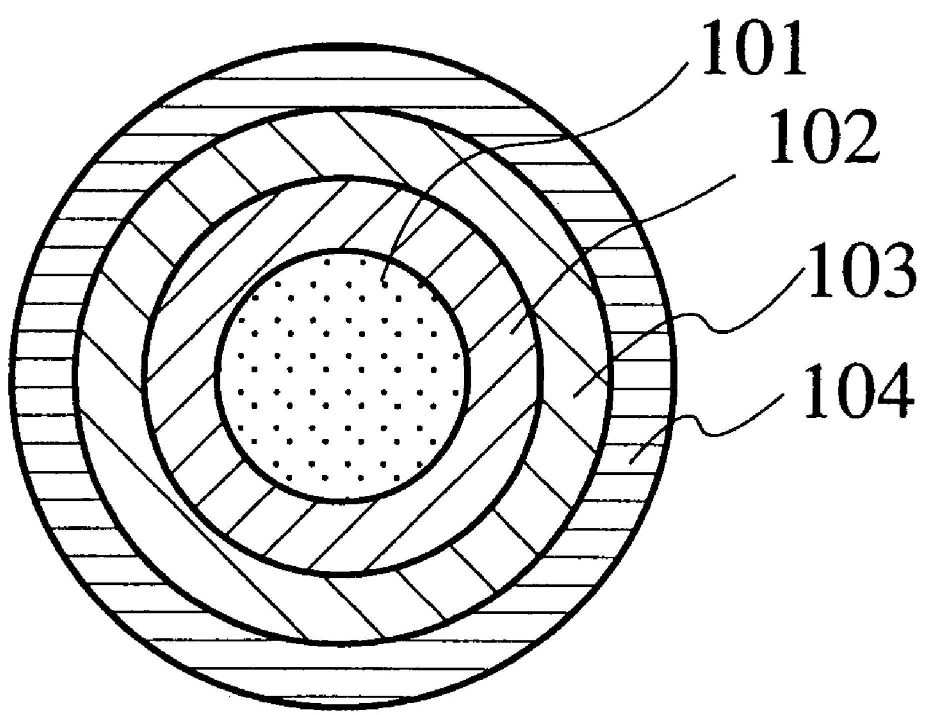
FIG. 1 is a schematic lateral sectional view showing an optical fiber cord in the prior art.

Various embodiments of the present invention will be described with reference to the accompanying drawings hereinafter. It is to be noted that the same or similar reference numerals are applied to the same or similar parts and elements throughout the drawings, and description of the same or similar parts and elements will be omitted or simplified.

First Embodiment

A first embodiment of the present invention will be explained in detail hereunder.

Figure 2:
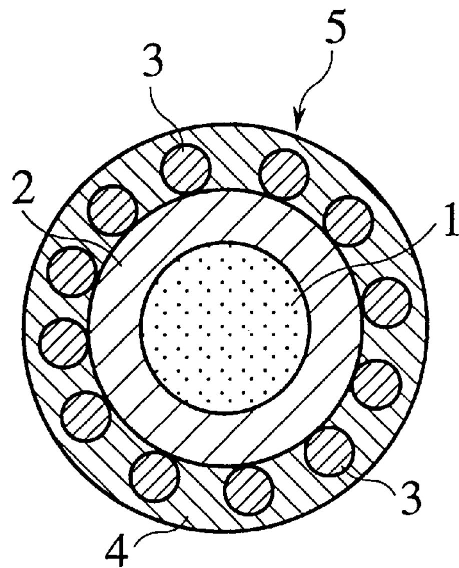
FIG. 2 is a schematic lateral sectional view showing an optical fiber cord according to a first embodiment of the present invention.

FIG. 2 is a schematic lateral sectional view showing an optical fiber cord according to a first embodiment of the present invention. In FIG. 1, a reference numeral 1 denotes an optical bare fiber. It is preferable that a standardized product with an outer diameter of 125 μm should be used as this optical bare fiber 1, but the optical bare fiberl is not limited to such a product.

Ultraviolet curing resin is coated on the optical bare fiber 1 and then cured to thus form a UV curable resin coated optical fiber 2. From the viewpoint of a smaller diameter, the optical fiber with an outer diameter of about 150 μm to 200 μm is preferable as this UV curable resin coated optical fiber 2.

Further, a thickness of a covering layer consisted of the ultraviolet curing resin may be consisted extremely thin like about 12.5 μm to 37.5 μm to be close to a mass-producible limit thickness. Preferably a resin with Young's modulus of 20 to 200 kg/mm$^2$, which has undergone the curing process, should be employed as the ultraviolet curing resin used herein. If a ultraviolet light irradiation time is reduced to remain an inner surface side of the covering layer as a soft uncured region and to make an outer surface side of the covering layer as a hard cured region, a single thin covering layer can carry out the same function as a double coating layer used in the ordinary UV curable resin coated optical fiber.

Metal monofilaments 3 are provided longitudinally on an outer peripheral surface of the UV curable resin coated optical fiber 2. It is preferable that a metal wire which has a diameter of 20 to 50 μm and an elastic modulus in tension of more than 10,000 kg/$MM^2$, for example, a steel wire (elastic modulus in tension is 20,000 kg/$mm^2$), a tungsten wire (elastic modulus in tension is 40,000 kg/$mm^2$), etc. should be used as the metal monofilament 3. Preferably, the metal monofilament 3 on which an enamel thin film of 2 to 3 μm thick is formed to prevent rust and to enhance adhesiveness between the monofilament and the resin should be employed. The metal monofilament acting as the reinforcing member is superior in that it has a high elastic modulus and good flexibility.

The number of the metal monofilaments can be determined according to required reinforcement level, i.e., a degree of smaller diameter of the optical fiber cord, and an elastic modulus in tension, an outer diameter, etc. of the used metal monofilaments. Normally the number of the metal monofilaments is set in the range of two to twenty, preferably ten to twelve. Preferably, as shown in FIG. 2, the metal monofilaments 3 should be provided longitudinally to be arranged substantially uniformly around a periphery of the UV curable resin coated optical fiber 2.

A resin covering layer 4 which is formed integrally with the UV curable resin coated optical fiber 2 to surround respective metal monofilaments 3 is provided. The resin covering layer 4 can be formed by coating the ultraviolet curing resin on the metal monofilaments 3 and the UV curable resin coated optical fiber 2, and then curing such ultraviolet curing resin made of urethane acrylate, epoxy acrylate, etc. As a consequence, an optical fiber cord 5 can be accomplished according to the first embodiment of the present invention. From a respect of the smaller diameter, it is preferable that a thickness of the resin covering layer 4 should be set to such an extent that the metal monofilaments 3 are covered with the resin. In other words, preferably the thickness of the resin covering layer 4 should be set to a thickness which is substantially equal to an outer diameter of the metal monofilaments 3 to hold respective metal monofilaments 3.

The resin constituting the resin covering layer 4 is not limited to the above ultraviolet curing resin. Thermosetting resin such as epoxy resin, unsaturated polyester resin, etc. may be employed.

The metal monofilaments 3 can be surrounded by the resin in the resin covering layer 4 to be brought into contact tightly with the resin integrally. Therefore, the resin covering layer 4 can be highly reinforced by the metal monofilaments 3 along the longitudinal direction.

In addition, it is preferable that a packing factor of the metal monofilaments 3 in the resin covering layer 4 is set to 10 to 80 volumetric %. This is because, if the packing factor is set below 10 volumetric %, the reinforcement effect cannot be achieved and thus it is disadvantageous to the smaller diameter whereas, if the packing factor is set over 80 volumetric %, it is difficult in practice to manufacture the optical fiber cord 5.

In this manner, according to the optical fiber cord 5 of the first embodiment of the present invention, since the metal monofilaments 3 with the high elastic modulus can be filled in the resin covering layer 4 at a high packing factor, the resin covering layer 4 can have an extremely high tensile strength. Accordingly, the optical fiber cord 5 per se can also have a high anti-tension force. As a result, the finished diameter can be sufficiently made small to an extent of 250 μm, for example.

The resultant optical fiber cord 5 having the finished diameter of 250 μm can be handled in the similar way to the ordinary UV curable resin coated optical fiber having the outer diameter of 250 μm. Consequently, fusion-splicing, exposure of top end of the core fiber of the optical fiber cord, etc. can be easily executed by use of the existing provision.

Next, for purpose of illustration, a concrete example of the optical fiber cord will be explained hereunder. First, the UV curable resin coated optical fiber with a diameter of 150 μm can be prepared by coating the ultraviolet curing resin on the optical bare fiber with an outer diameter of 125 μm and then curing the resin. Then, twelve metal monofilaments are arranged uniformly on an outer periphery of the UV curable resin coated optical fiber to be provided longitudinally. Where each of the metal monofilaments can be formed by providing an enamel thin film on a bare steel wire with a diameter of 45 μm to have a diameter of 50 μm. Then, a resin covering layer of 50 μm thick is formed on the above resultant structure by coating the ultraviolet curing resin which has Young's modulus of 100 kg/$mm^2$ after cure and then curing the ultraviolet curing resin, whereby resulting in the optical fiber cord with the finished diameter of 250 μm. The packing factor of the steel wire in the resin covering layer of the optical fiber cord has been 60.7 volumetric %.

In contrast to the above concrete example of the optical fiber cord according to the first embodiment, the conventional optical fiber cord has been fabricated as follows. First, the aramid fiber yarn is provided on the above-employed UV curable resin coated optical fiber with a diameter of 150 μm along the longitudinal direction. Then, the same ultraviolet curing resin as above is coated and cured, thereby providing a fiber-reinforced covering layer with a thickness of 100 μm. As a result, the conventional optical fiber cord with the finished diameter of 150 μm has been prepared. The packing factor of the aramid fiber in the fiber-reinforced covering layer of the conventional optical fiber cord has been 50 volumetric %.

Figure 3:
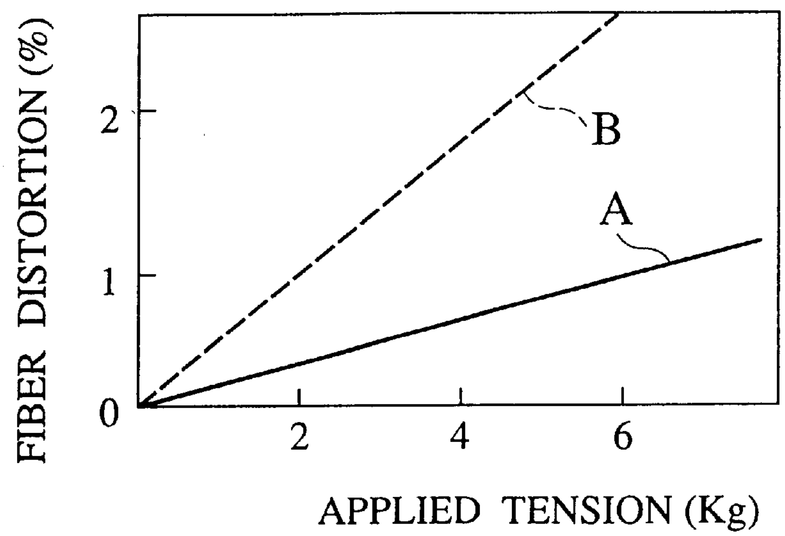
FIG. 3 is a graph showing tensile strength properties of the optical fiber cords according to the first embodiment of the present invention and the second related art, wherein a solid line A correspond to the present invention and a broken line B corresponds to the related art.

FIG. 3 is a graph showing tensile strength properties of the optical fiber cord according to the first embodiment of the present invention and the conventional optical fiber cord according to the second related art. In FIG. 3, a solid line A shows measured tensile strength property of the first embodiment of the present invention while a broken line B shows measured tensile strength property of the related art. From the graph in FIG. 3, it has been understood that, in the optical fiber cord according to the first embodiment indicated by the solid line A, fiber distortion can be reduced about ⅓ the conventional optical fiber indicated by the broken line B when the same tensile stress is applied to both optical fiber cords a also an tensile strength can be highly increased. Therefore, it should be noted that the optical fiber cord with a high tensile strength can be obtained even if the diameter of the optical fiber cord is made small.

As described above, in the optical fiber cord according to the first embodiment, the metal monofilaments which have the high elastic modulus, show great flexibility, and enable the sufficiently high packing factor have been employed as the reinforcing member. Therefore, the tensile strength of the optical fiber cord per se can be extremely increased. This makes it possible to make the finished diameter of the optical fiber cord extremely small to an extent of about 250 μm, for example.

Second Embodiment

A second embodiment of the present invention will be explained in detail hereunder.

Figure 4:
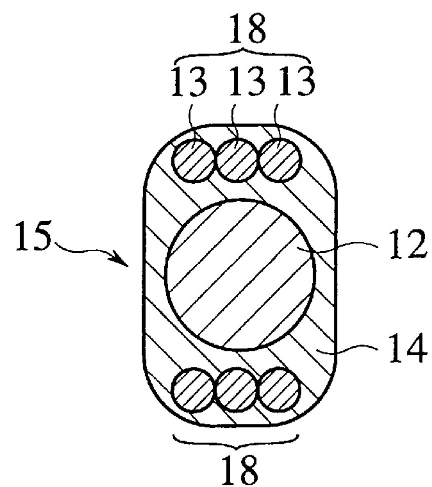
FIG. 4 is a schematic lateral sectional view showing an optical fiber cord according to a second embodiment of the present invention.

FIG. 4 is a schematic lateral sectional view showing a single core fiber optical fiber cord according to the second embodiment of the present invention. In FIG. 4, a reference numeral 12 denotes a UV curable resin coated optical fiber. This UV curable resin coated optical fiber 12 is formed by providing first and second covering layers on an optical bare fiber with an outer diameter of 125 $\mu$m so as to have an outer diameter of 250 $\mu$m.

A pair of tension members 18 each of which is made of a set of three tension wires 13 are provided on a UV curable resin coated optical fiber 12 longitudinally. The tension members 18 are covered integrally with the covering layer 14 to thus construct an optical fiber cord 15.

In the optical fiber cord 15, the covering layer 14 is formed to have a rectangular lateral sectional shape. More particularly, as shown in FIG. 4, two sets of three tension members 18 are arranged in both short side areas of the covering layer 14 symmetrically with respect to the UV curable resin coated optical fiber 12 so as to oppose to each other. No tension member 18 is arranged in long side areas of the covering layer 14.

A small wire which is made of aramid fiber, PBO(P-Phenylene-2,6-Benzobis Oxazole) fiber, glass fiber, steel wire, or the like and has an outer diameter of 20 to 50 $\mu$m may be employed as the above tension wire 13. Thermoplastic resin, thermosetting resin, ultraviolet curing resin, or the like may be employed as the above covering layer 14.

The optical fiber cord having the above configuration is formed such that normally the long side and the short side of a sectional shape are set to 0.35 to 0.40 mm and 0.26 to 0.28 mm respectively, but the sectional shape is not limited to such ranges.

As described above, in the optical fiber cord 15 according to the second embodiment of the present invention, the outer diameter can be formed extremely small and also the mechanical strength can be enhanced. Therefore, the optical fiber cord 15 can be employed without covering the reinforcing tube, etc. as it is.

Third Embodiment

A third embodiment of the present invention will be explained in detail hereunder.

Figure 5:
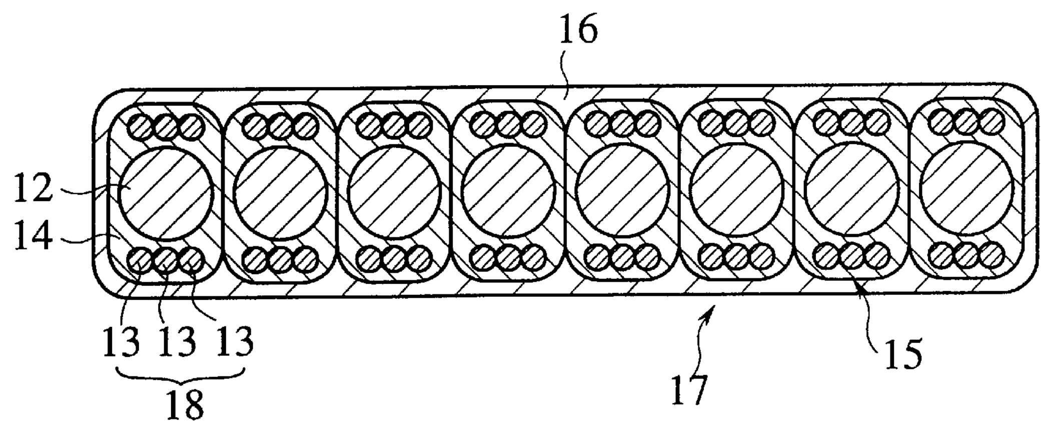
FIG. 5 is a schematic lateral sectional view showing a ribbon cord employing the optical fiber cord, according to a third embodiment of the present invention.

FIG. 5 is a schematic lateral sectional view showing a ribbon cord employing the above optical fiber cord, according to a third embodiment of the present invention. The ribbon cord 17 is constructed like a ribbon by arranging eight single core optical fiber cords shown in FIG. 4 in parallel in a straight line and then integrally putting the optical fiber cords 15 together by means of a matrix material 16.

Respective optical fiber cords 15 are aligned such that the areas of the covering layers 14 in which no tension member 18 is provided are placed adjacently, i.e., the long sides of the covering layers 14 are brought into contact with each other. According to such an arrangement, the tension members 18 in the optical fiber cord 15 are placed only on the upper and lower surface sides of the ribbon cord 17 in FIG. 5.

The same resin as the above covering layer 14 may be employed as the matrix material 16. But it is preferable that Young's modulus of the resin for the matrix material 16 is set lower than that of the resin for the covering layer 14. Accordingly, a branch operation to separate the ribbon cord 17 into individual optical fiber cords 15 can be made easy.

Since there exists no tension member 18 between the adjacent UV curable resin coated optical fibers 12 of the optical fiber cords 15 in the ribbon cord 17 having the above configuration but there exist only the covering layers 14 between the adjacent UV curable resin coated optical fibers 12, the thickness of the covering layers 14 can be adjusted. For this reason, a width of the ribbon cord 17 can be adjusted so as to coincide with that of the ordinary optical fiber ribbons, and in addition intervals between the optical bare fibers can be also be adjusted to coincide with those between the optical bare fibers in the ordinary optical fiber ribbons. Therefore, this ribbon cord 17 and the ordinary optical fiber ribbon can be connected collectively with each other.

Since no tension member is provided along the width direction of the ribbon cord 17 as stated above, the width per se of the ribbon cord 17 can be reduced dimensionally, which can promote the high density assembly. In addition, since the tension members 18 are aligned in parallel in both the upper and lower surface side areas, sufficient mechanical strength of the ribbon cord 17 can be assured.

In addition, since the tension members 18 are aligned in parallel only near both the upper and lower surfaces of this ribbon cord 17, the tension members 18 can be simply and collectively removed from the ribbon cord 17. Furthermore, the matrix material 16 and the covering layer 14 can be easily and collectively removed from the ribbon cord 17.

When the ribbon cord 17 is separated into the optical fiber cords 15 respectively, the optical fiber cords 15 per se can be protected by respective tension members 18. Therefore, there is no necessity of reinforcing the optical fiber cords 15 again by coating a reinforcing tube, etc. thereon. It can thus be understood for one skilled in the art that the above ribbon cord 17 can be employed as a multi-core branch cord as it is.

In the ribbon cord 17 of the present invention, the number of the tension wires 13 is not limited to three, and therefore one, two, four, etc. may be employed. In addition, the tension wires 13 may be formed by parallel (i.e., ellipse or rectangle in section) wires.

In the ribbon cord 17 formed by putting a plurality of optical fiber cords 15 together by virtue of the matrix material 16, the tension wires 13, the matrix material 16, and the covering layer 14 can be easily and collectively removed and also collective fusion-splicing between the ribbon cord 17 and the ordinary optical fiber ribbons can be achieved. Various advantages can be achieved such that the optical fiber cords 15 obtained by branching this ribbon cord 17 have high mechanical strength and that such optical fiber cords 15 can thus be employed as the optical fibers as they are.

Figure 6:
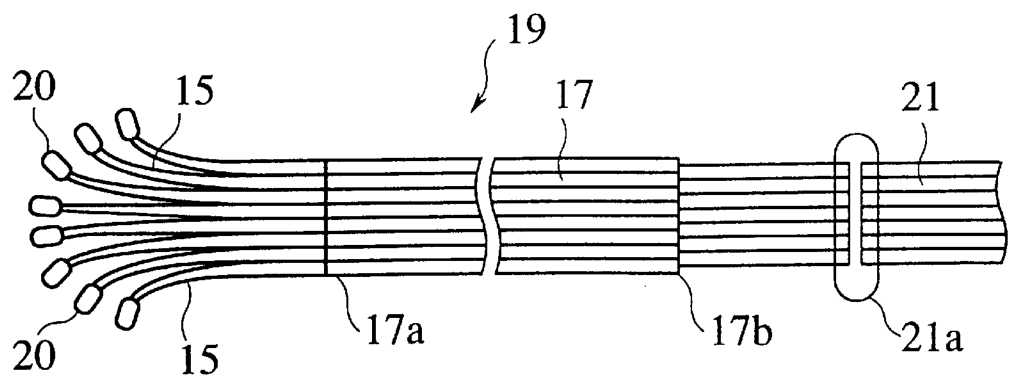
FIG. 6 is a schematic plan view showing a configuration of a ribbon cord branch line with the use of the ribbon cord according to the third embodiment of the present invention.

FIG. 6 is a schematic plan view showing a configuration of a ribbon cord branch line with the use of the ribbon cord according to the third embodiment of the present invention. In this ribbon cord branch line 19, one end portion 17*a* of the ribbon cord 17 shown in FIG. 5 is branched into a plurality of optical fiber cords 15. Respective top ends of the UV curable resin coated optical fibers 12 in the optical fiber cords 15 are exposed, and then optical connectors 20, or the like are fitted and coupled to the top ends of the UV curable resin coated optical fibers 12 respectively.

In the other end portion 17*b* of the ribbon cord 17, the tension members 18 which are provided near the upper and lower surfaces are cut out and also the matrix material 16 and the covering layers 14 are collectively removed so as to expose the top ends of the UV curable resin coated optical fibers 12. These UV curable resin coated optical fibers 12 are collectively fusion-spliced to one end 21*a* of a optical fiber ribbon 21 which has the core fibers of the same number.

In the ribbon cord branch line 19 having the above configuration, the optical fiber cords 15 which are obtained by branching the one end portion 17*a* of the ribbon cord 17 can be reinforced by the built-in tension members 18 to thus attain the high mechanical strength. Therefore, the branched optical fiber cords 15 can be used without the reinforcing tube and consequently the high density assembly of the ribbon cord 17 can employs as it is.

Since respective intervals between the UV curable resin coated optical fibers 12 of the ribbon cord 17 can be made equal to those between the ordinary optical fiber ribbons 21, the UV curable resin coated optical fibers 12 of the ribbon cord 17 and the optical fiber ribbons 21 can be connected by virtue of collective fusion-splicing in the other end portion 17*b*.

Hence, the ribbon cord branch line 19 can be easily manufactured and reduced in size, so that it can be used in a crawl utility space.

Various modifications will become possible for those skilled in the art after receiving the teaching of the present disclosure without departing from the scope thereof.

What is claimed is:

1. An optical fiber cord comprising:

an optical fiber;

a UV curable resin coating the optical fiber;

a plurality of monofilaments provided on the UV curable resin coated optical fiber along a longitudinal direction substantially in parallel with a longitudinal axis of the UV curable resin coated optical fiber; and a resin covering layer provided integrally with the UV curable resin coated optical fiber so as to surround the plurality of monofilaments and form a resultant structure, wherein the plurality of monofilaments include metal wires each of which has a diameter of 20 μm to 50 μm and an elastic modulus in tension of more than 10,000 kg/mm$^2$ and less than 50,000 kg/mm$^2$, and wherein a finished diameter of the resultant structure is less than 500 μm.

2. An optical fiber cord according to claim 1, wherein an outer diameter of the UV curable resin coated optical fiber is set in a range of 120 μm to 200 μm, an outer diameter of the monofilaments is set in a range of 20 μm to 50 μm, and the finished diameter of the resultant structure is set in a range of 190 μm to 300 μm.

3. An optical fiber cord comprising:

an optical fiber;

a UV curable resin coating the optical fiber;

metal monofilaments provided longitudinally on an outer periphery of the UV curable resin coated optical fiber substantially in parallel with a longitudinal axis of the UV curable resin coated optical fiber; and a resin covering layer provided integrally with the UV curable resin coated optical fiber so as to surround the metal monofilaments and form a resultant structure, wherein the metal monofilaments include metal wires each of which has a diameter of 20 μm to 50 μm and an elastic modulus in tension of more than 10,000 kg/mm$^2$ and less than 50,000 kg/mm$^2$, and wherein a finished diameter of the resultant structure is less than 500 μm.

4. An optical fiber cord according to claim 3, wherein each of the metal wires include an enamel thin film coating with a thickness of 2 to 3 μm.

5. An optical fiber cord according to claim 3, wherein a packing factor of the metal monofilaments in the resin covering layer is set to 10 to 80 volumetric %.

6. An optical fiber cord according to claim 3, wherein the resin covering layer includes a cured ultraviolet curing resin coating.

7. An optical fiber cord according to claim 3, wherein a thickness of the resin covering layer is set substantially equal to an outer diameter of the metal monofilament.

8. An optical fiber cord comprising:

an optical fiber;

a UV curable resin coating the optical fiber;

a plurality of tension wires provided longitudinally on the UV curable resin coated optical fiber substantially in parallel with a longitudinal axis of the UV curable resin coated optical fiber; and a covering layer provided integrally with the UV curable resin coated optical fiber so as to have a rectangular sectional shape and form a resultant structure, wherein the plurality of tension wires are provided in the covering layer on a pair of parallel-opposing surface sides and no tension wire is provided in the covering layer on another pair of parallel-opposing surface sides, wherein the plurality of tension wires include metal wires each of which has a diameter of 20 μm to 50 μm and an elastic modulus in tension of more than 10,000 kg/mm$^2$ and less than 50,000 kg/mm$^2$, and wherein a length and width of the rectangular sectional shape is in a range of 350 μm to 400 μm and 260 μm to 280 μm, respectively.

9. A ribbon cord comprising:

a plurality of optical fiber cords each of which includes a plurality of tension wires provided longitudinally on an optical fiber substantially in parallel with a longitudinal axis of the UV curable resin coated optical fiber, said optical fiber having a UV curable resin coating; and a covering layer provided integrally with the UV curable resin coated optical fiber so as to have a rectangular sectional shape and form a resultant structure, wherein the plurality of tension wires are provided in the covering layer on a pair of parallel-opposing surface sides and no tension wire is provided in the covering layer on another pair of parallel-opposing surface sides, wherein the plurality of optical fiber cords are arranged in parallel such that the another pair of parallel-opposing surface sides of respective optical fiber cords are brought into tight contact with each other by integrally covering the plurality of optical fiber cords with a matrix material, wherein the plurality of tension wires include metal wires each of which has a diameter of 20 μm to 50 μm and an elastic modulus in tension of more than 10,000 kg/mm$^2$ and less than 50,000 kg/mm$^2$, and wherein a length and width of the rectangular sectional shape is in a range of 350 μm to 400 μm and 260 μm to 280 μm, respectively.

10. A ribbon cord branch line comprising:

a ribbon cord including a plurality of optical fiber cords each of which includes a plurality of tension wires provided longitudinally on an optical fiber substantially in parallel with a longitudinal axis of the UV curable resin coated optical fiber, said optical fiber having a UV curable resin coating; and a covering layer provided integrally with the UV curable resin coated optical fiber so as to have a rectangular sectional shape and form a resultant structure, wherein the plurality of tension wires are provided in the covering layer on a pair of parallel-opposing surface sides and no tension wire is provided in the covering layer on another pair of parallel-opposing surface sides, wherein the plurality of optical fiber cords are arranged in parallel such that the another pair of parallel-opposing surface sides of respective optical fiber cords are brought into tight contact with each other by integrally covering the plurality of optical fiber cords with a matrix material, wherein one end of the ribbon cord is branched into respective optical fiber cords and then connectors are fitted individually onto respective top ends of the optical fiber cords, and other end of the ribbon cord is collectively spliced to multi-fiber ribbons, wherein the plurality of tension wires include metal wires each of which has a diameter of 20 $\mu$m to 50 $\mu$m and an elastic modulus in tension of more than 10,000 kg/mm$^2$ and less than 50,000 kg/mm$^2$, and wherein a length and width of the rectangular sectional shape is in a range of 350 $\mu$m to 400 $\mu$m and 260 $\mu$m to 280 $\mu$m, respectively.

* * * * *